July 6, 1954  T. W. CLIFFORD ET AL  2,682,804
OPTICAL MICROMETER FOR ALIGNMENT TELESCOPES
Filed Aug. 6, 1951  2 Sheets-Sheet 1
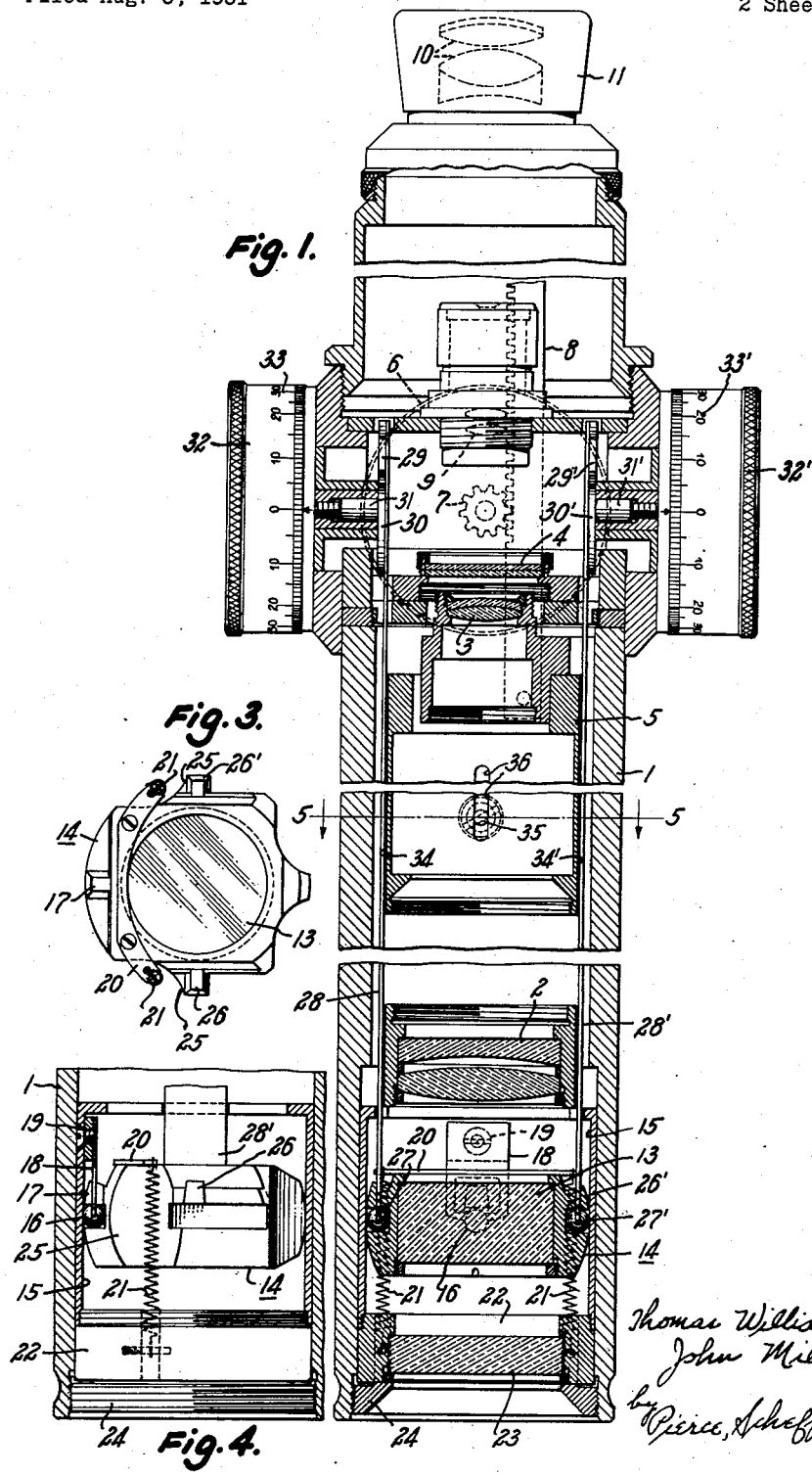
Inventors:
Thomas William Clifford,
John Mills,
by Pierce, Scheffler & Parker,
Attorneys.

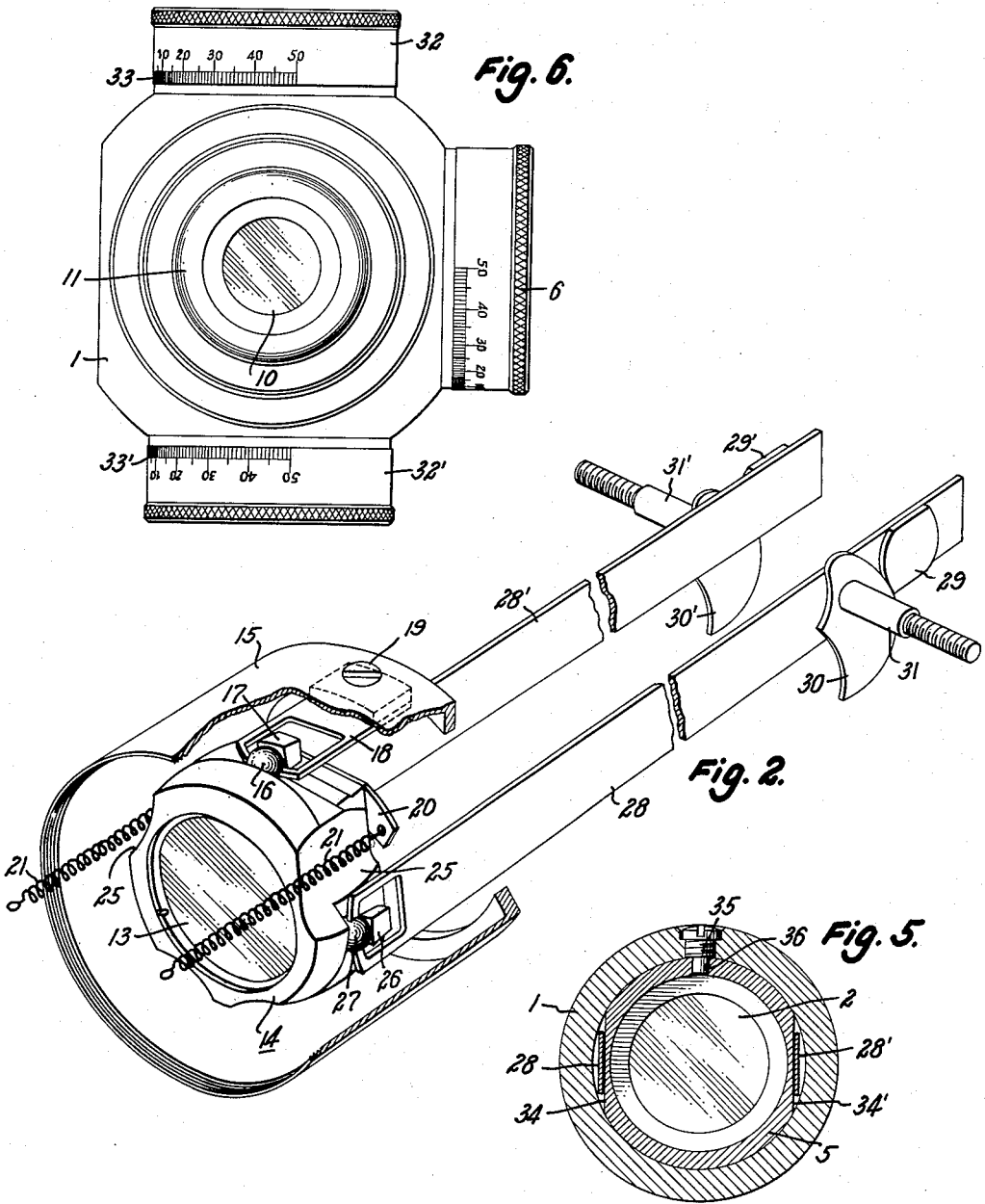

Patented July 6, 1954

2,682,804

UNITED STATES PATENT OFFICE 2,682,804

OPTICAL MICROMETER FOR ALIGNMENT TELESCOPES

Thomas William Clifford and John Mills, Leicester, England, assignors to Taylor, Taylor & Hobson Limited, Leicester, England, a British company Application August 6, 1951, Serial No. 240,522

Claims priority, application Great Britain September 26, 1950

6 Claims. (Cl. 88—32)

1

This invention relates to optical micrometers for use with alinement telescopes, and more particularly alinement telescopes with self-contained optical micrometers.

In order to maintain accuracy of measurement in mechanical methods of testing and checking the alinement and parallelism of workpieces such as bearings, assembly jigs, long machine beds and other similar articles it is customary, especially in the heavy engineering industries, to use alinement telescopes.

In the usual methods of using these telescopes an image of the object under observation and test is formed in the plane of a graticule in the telescope, the said graticule usually being marked with two lines at right angles to each other, the point of intersection being accurately positioned on the optical axis of the telescope. The telescope is usually operated in conjunction with a collimator unit or a target, a graticule in which can be observed superimposed on that in the telescope. With accurate scales on the graticules, alinement telescopes of this nature afford by direct reading a degree of accuracy amounting, in the case of want of parallelism, to approximately six seconds of an arc and, in the case of lack of alinement, to approximately 0.01 inch, and by estimation, an accuracy of two seconds for parallelism and 0.002 inch for alinement.

In order to increase the working accuracy of these instruments when measuring alinement they can be fitted with optical micrometers by means of which it is possible to obtain an even greater accuracy of setting amounting, for example, to 0.001 inch at a distance of 50 ft. by direct reading. The optical micrometers consist of a block or blocks of glass mounted in front of the telescope and in the optical axis thereof, the arrangement being such that they can be tilted—usually by the manual operation of a control knob or knobs—about an axis at right angles to the optical axis of the telescope. The effect of tilting one of the glass blocks is to cause an apparent shift of the target in relation to the telescope axis in a direction at right angles to the axis of tilt of the block and the angle of tilt is relatively large for a small amount of shift, thus the knob controlling a block can be suitably graduated, for example, in intervals of 0.001 inch relative displacement.

The method used is to tilt the blocks until a central cross or reference point on the target being viewed is accurately coincident with the cross on the graticule in the telescope, and the control knob graduations then indicate the amount by which the target is displaced.

2

In the optical micrometers employed heretofore and utilizing only one glass block, the block has been mounted in front of the telescope objective and has been operated, in one direction only, by a graduated operating knob adjacent to the block or at the eyepiece end of the telescope. In this arrangement it has been necessary to rotate the telescope about its own axis in order to obtain measurements in the required direction which may be horizontal or vertical or any intermediate direction.

In the optical micrometers hitherto used and comprising two glass blocks these have been mounted on the end of the telescope, one in front of the other, and each has been pivoted about an axis at right angles to the other and at right angles to the optical axis of the telescope. This type of micrometer suffers from the disadvantage that its size is larger than the diameter comprising the main body of the telescope so that it has to be attached to the telescope after the instrument has been placed in position, for example, after the telescope has been pushed through a bore, and it can be used only if the end of the telescope projects, for example, beyond the bore.

Objects of the present invention are to provide improved optical micrometers which overcome these disadvantages. Objects are to provide optical micrometers which include only one glass block tiltable in two directions at right angles to each other and to the optical axis of the telescope with which the micrometer is used. A further object is to provide an optical micrometer which is built into an alinement telescope in front of the telescope objective. More specifically, an object is to provide an alinement telescope having an optical micrometer in front of the telescope objective and adjustable by graduated control knobs mounted adjacent the telescope eyepiece.

These and other objects and the advantages of the invention will be apparent from the following specification when taken with the accompanying drawings, in which:

Fig. 1 is a longitudinal central section through an alinement telescope which includes an optical micrometer embodying the invention;

Fig. 2 is a fragmentary perspective view, on an enlarged scale, of the major elements of the optical micrometer as seen when removed from the telescope housing;

Fig. 3 is an elevation, as seen from the telescope side, of the cell or mounted glass block of the optical micrometer;

Fig. 4 is an elevation of the cell, with associated parts of its supporting structure shown in section;

Fig. 5 is a transverse cross-section on line 5—5 of Fig. 1; and

Fig. 6 is an end elevation of the alinement telescope and optical micrometer of Fig. 1.

In the drawings, the reference numeral 1 identifies the tube of an alinement telescope of conventional or desired type and including an objective 2, a lens 3 and graticule 4 carried by a lens barrel 5 which is adjustable within the tube 1 by a focusing knob 6, see Fig. 6, through a pinion 7 and rack 8, a stationary lens 9, and a lens 10 in the eyepiece 11 which is adjustable in the tube 1 for focusing upon the graticule 4.

The telescope tube or housing 1 is extended well beyond the objective lens 2 to provide a chamber for receiving the optical micrometer which comprises a heavy glass block 13 in a mounting or cell 14 of generally spherical shape which is supported for tilting movement within a sleeve 15 by an element 16 of ball or other shape which is recessed into the cell 14 and has a point or small area contact with a lug or projection 17 which overlies the ball 16. The ball 16 is welded or otherwise secured between the forked legs of a strap 18 which is secured to the sleeve 15 by a screw 19. A strap 20 is secured to the inner face of the cell 14, and a pair of tension springs 21 are connected between the ends of the strap 20 and a ring 22 which carries a glass 23 for sealing the end of the telescope tube 1 and which is retained in place by a gland nut 24. The cell or mounting 14 is provided with longitudinal notches 25 for passage of the springs 21 through the cell.

The cell is transversely grooved and cut away longitudinally to provide two lugs 26, 26' spaced 90° from and at opposite sides of the lug 17 which, with the member 16, provides a tilting or universal joint support for the cell 14 within the sleeve 15. Members 27, 27' of ball or other form providing point or small area contacts with the lugs 26, 26' respectively are located in the transverse grooves and the respective lugs are yieldingly maintained in contact with these members by the tension springs 21. The members 27, 27' are secured to the forked ends of straps 28, 28' which extend longitudinally of the telescope housing 1 and have cam followers 29, 29' secured thereto adjacent the telescope eyepiece. Cams 30, 30' for engagement with the cam followers to tilt the cell 14 in opposition to the forces exerted by the springs 21 are carried by shafts 31, 31' which are angularly adjustable by control knobs 32, 32' located adjacent the eyepiece of the telescope and preferably with their axes in the transverse plane of the axis of the focusing knob 6. The control knobs are thus in a very convenient position for operation and also for reading their scales 33, 33' respectively which are graduated to indicate the displacement of the line of sight from the optical axis of the telescope, each scale division corresponding for example to 0.001 inch.

As best shown in Fig. 5, opposite sides of the lens mount 5 are machined or milled to provide parallel plane surfaces 34, 34' which cooperate with the cylindrical inner surface of the telescope tube 1 to form longitudinal passageways of sector shape in cross-section in which the adjusting straps 28, 28' are located. The lens mount 5 is guided for longitudinal movement by a stud 35 which is threaded into the tube 1 and projects into a longitudinal slot 36 of the lens mount.

The surfaces of the lugs 17, 26 and 26' in contact with the balls 16, 27 and 27' respectively lie in a plane parallel to the faces of the glass block 13, and these surfaces are maintained in contact with the balls by the springs 21. The balls provide a three-point support for the cell 14 and the block 13; the ball 16 being fixed and the balls 27 and 27' being adjustable axially of the telescope by means of the control knobs 32 and 32' respectively. The zero marks of scales 34 and 34' are so positioned that the surfaces of the block 13 are normal to the telescope axis at the zero readings, and the line of sight beyond the optical micrometer therefore coincides with the telescope axis.

In use of the instrument, for example to check the alinement of two bearings, the telescope is mounted axially in one bearing and a target is mounted axially in the other bearing. A faulty alinement is indicated if the graticule of the target is not accurately superposed upon the graticule 4 of the telescope when the control knobs 32 and 32' are adjusted for zero readings on scales 34 and 34'. The extent and direction of the deviation are determined by adjusting the control knobs to displace the line of sight, parallel to the axis of the telescope, to superpose the graticules of the target and the telescope.

The cell 14 tilts about axes at right angles to each other which intersect at a point outside of the field of the block 13, the axes being defined by lines drawn through the point contacts of balls 16 and 27', or balls 16 and 27, with the cell 14 when the control knobs 33 or 33' are turned to move the balls 27 or 27' respectively longitudinally of the telescope tube. The spherical portions of the surface of the cell 14 snugly engage the inner wall of the sleeve 15 to guide the cell 14 for such tilting movements about the point contact of the ball 16 and lug 17. The extent of the displacement of the line of sight from the axis of the telescope is measured, in two directions at right angles to each other, by the scales 34 and 34' of the control knobs 33 and 33' respectively.

Although the micrometer block 13 has been described as a glass block, it is to be understood that it may be made of a transparent synthetic plastic to obtain the advantage of the higher index of refraction of such materials. It is presently preferred to build the optical micrometer into the alinement telescope, as herein disclosed, but it is apparent that the novel optical micrometer may be manufactured as an auxiliary device for use with existing alinement telescopes.

It is therefore to be understood that the invention is not limited to the particular apparatus herein illustrated and described as various modifications which may occur to those familiar with the art fall within the spirit and scope of the invention as set forth in the following claims.

We claim:

1. An alinement telescope including a housing having therein an eyepiece and an objective lens, and an optical micrometer within said housing in front of said objective lens; said optical micrometer comprising a single transparent optical block having two parallel plane surfaces, means mounting said block within said housing with said plane surfaces normally at right angles to the optical axis of said telescope, and means for adjusting said mounting means to tilt said block about two axes at right angles to each other and intersecting at a point outside of the field of said optical block; said adjusting means including a pair of straps within said housing, the outer ends of said straps engaging said mounting means at points at opposite sides of the point of intersection of said tilting axes, and adjustable means including control knobs at the inner ends of said straps for displacing the same within the housing to tilt said mounting means and optical block about the respective tilting axes; said control knobs being calibrated to indicate the extent of the parallel displacement of the light beam from the optical axis of the telescope on passing through the block.

2. An alinement telescope as recited in claim 1, wherein said control knobs are supported on said housing adjacent said eyepiece.

3. An alinement telescope as recited in claim 1, wherein said adjustable means includes, a cam secured to each control knob, and cam followers on said straps in engagement with the respective cams.

4. An alinement telescope comprising a tubular housing having therein an eyepiece and an objective lens, and an optical micrometer within said housing in front of said objective lens; said optical micrometer comprising a single transparent optical block having two parallel plane surfaces, a sleeve within said housing in front of said objective lens, a member in which said block is mounted, said member being within said sleeve and having spherical surface portions for guiding engagement therewith, said member being circumferentially and longitudinally grooved to provide three lugs at the telescope side of said cell and circumferentially spaced at 90°, supporting members in said circumferential grooves and having substantially point contacts with the respective lugs, means securing the center supporting member to said sleeve outside of the field of said optical block, means including straps extending longitudinally of said housing carrying the outer supporting members, means including control knobs mounted on said housing for displacing said straps to tilt said mounting member and optical block about axes at right angles to each other and passing through said center supporting member, and spring means maintaining said lugs in engagement with the respective supporting members; said control knobs being calibrated to indicate the extent of parallel displacement of the light beams from the optical axis of the telescope on passing through the optical block.

5. An alinement telescope as recited in claim 4, wherein cam followers are carried by the respective straps at the ends thereof and remote from said supporting members, and cams cooperating with the respective cam followers for displacing said straps in opposition to said spring means are actuated by said control knobs.

6. An alinement telescope as recited in claim 5, wherein said telescope includes a lens assembly adjustable in said housing for focusing, and a focusing knob adjacent the eyepiece for adjusting said lens assembly, and the axes of said focusing knob and said control knobs are in a common plane transverse to the optical axis of the telescope.

References Cited in the file of this patent

UNITED STATES PATENTS

| Number | Name | Date |
|---|---|---|
| 2,150,629 | Mossberg | Mar. 14, 1939 |
| 2,189,766 | Unertl | Feb. 13, 1940 |
| 2,233,441 | Whittaker | Mar. 4, 1941 |
| 2,483,897 | Godfrey | Oct. 4, 1949 |

FOREIGN PATENTS

| Number | Country | Date |
|---|---|---|
| 509,279 | Great Britain | July 13, 1939 |

OTHER REFERENCES

Microtecnic, vol. V, issue 2, March-April 1951, pages 93 through 96.